May 23, 1972 L. M. METZGER 3,664,735
DIGITAL ENCODING APPARATUS FOR THE SYNCHRONIZATION OF SEPARATE PICTURES AND SOUND RECORDS
Filed May 4, 1970
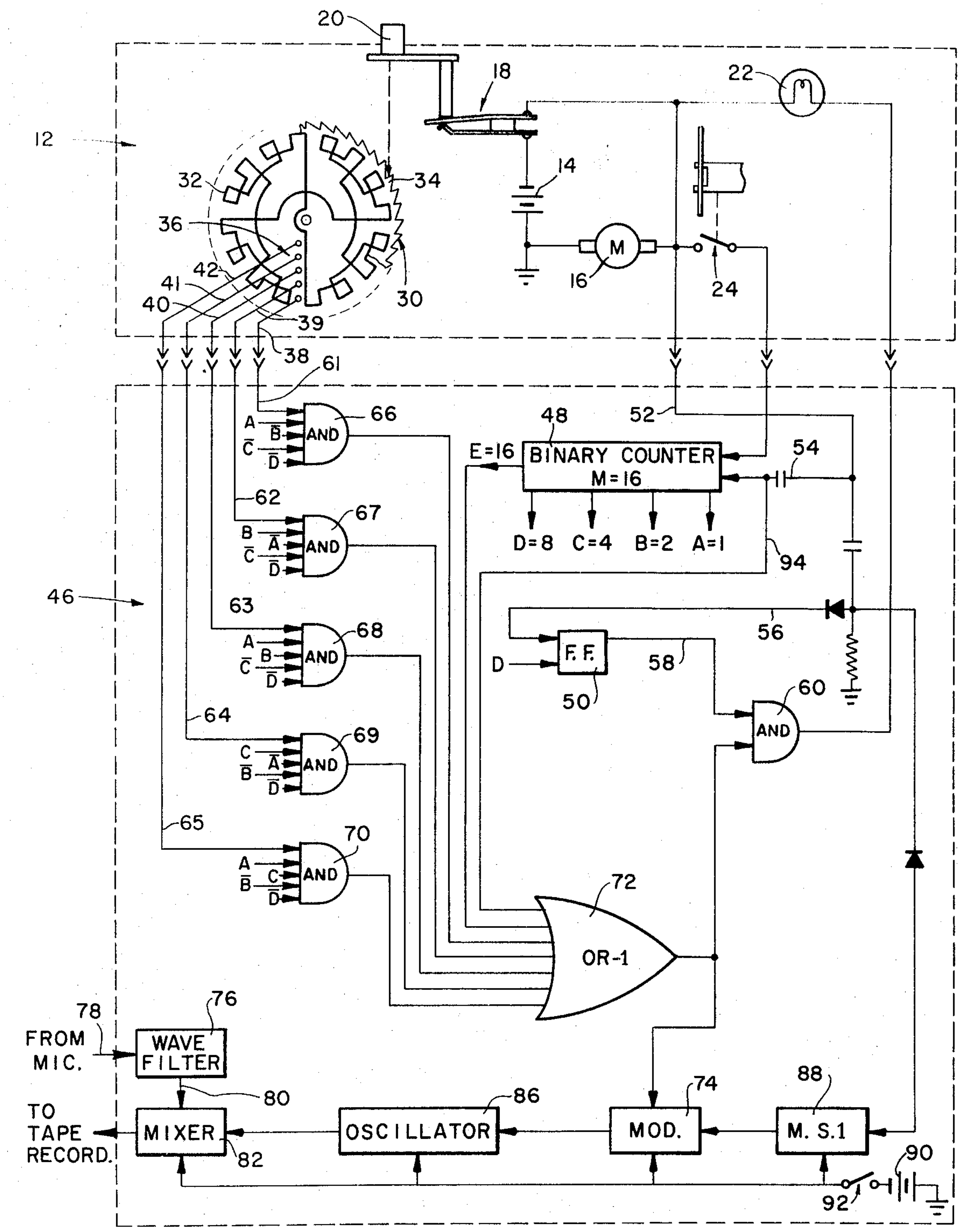
LENARD M. METZGER
*INVENTOR.*
BY *Milton S. Sales*
*Robert W Hampton*
ATTORNEYS United States Patent Office 3,664,735
Patented May 23, 1972

3,664,735

DIGITAL ENCODING APPARATUS FOR THE SYNCHRONIZATION OF SEPARATE PICTURES AND SOUND RECORDS

Lenard M. Metzger, Rochester, N.Y., assignor to Eastman Kodak Company, Rochester, N.Y.

Filed May 4, 1970, Ser. No. 34,195
Int. Cl. G03b *17/24, 21/52, 31/04*
U.S. Cl. 352—24 11 Claims

ABSTRACT OF THE DISCLOSURE

Apparatus usable with an ordinary magnetic tape recorder for preparing sound motion pictures includes a camera having means to code mark film, means to produce a sync pulse signal indicative of the camera speed, and a digital encoding device. An accessory device couples the camera and a tape recorder for applying matching scene identification codes to the tape sound track and to the film. A film speed code is also applied to the tape for synchronized playback.

CROSS-REFERENCE TO RELATED APPLICATION

Reference is made to commonly assigned copending U.S. Pat. application Ser. No. 31,182, entitled Apparatus for the Synchronization of Separate Picture and Sound Records, filed in the name of M. Csontos.

BACKGROUND OF THE INVENTION

Field of the invention

The present invention relates to sound accompaniment for motion picture photography, and more particularly to the synchronization of a separate sound recording with its associated film image.

Description of the prior art

There are several products in commercial use for producing sound accompanied motion picture films for public reproduction. For example, in accordance with one widely used method, the sound is optically recorded on the film by light patterns as the scene is photographed. As the film is processed, both the sound track and the image track are developed simultaneously so that proper synchronization is attained. Such systems have to now been considered too complicated and expensive for amateur use.

With the advent of Super 8 film, home movies are becoming increasingl popular. However, home sound motion pictures have not met with the same popularity as silent movies even though there have been many different proposals in the past for camera and/or recorders designed to produce such films.

Two such proposals are disclosed in U.S. Pats. No. 2,679,187 to R. C. Bitting, Jr. and No. 3,266,862 to R. G. Wagoner. The Bitting apparatus includes a camera vibration pickup which produces a signal indicative of camera speed. That signal is combined with a scene sound signal and recorded on magnetic tape. During replay, the sound and speed signals are sepaarted and the latter is used to regulate the speed of a projector.

The apparatus described in the Wagoner patent is somewhat similar to that of Bitting except that Wagoner provides a timing signal source for establishing initial synchronization, a reference signal then being used to maintain such synchronization.

While the above described prior art systems are suitable for their intended purposes, they do not provide positive identification of picture and sound records to insure against possible mismatching of the pictures and sound scenes. The Bitting apparatus is designed solely to keep a projector in synchronization with a recorder one initial synchronization has been established. The Wagoner system provides no means for identifying one sound scene from another and no means for positively marking a picture record with sound recording information so that it may later be compared to the recording to indicate which picture scenes are accompanied by sound and which are not. In the event that the user of such a system wishes to have the sound transferred to a magnetically stripped film, positive identification of the sound and picture scenes to prevent inadvertent transfer of sound from one scene to the picture of another scene is not assured.

One commercially available system accomplishes synchronization of a recorder and projector in response to a "start" mark on the film, and to "synchronization" and "stop" signals recorded on the tape. The camera flashes the "start" mark on the film at the beginning of every sound sequence and provides one electrical sync pulse for each frame advanced during the sound sequence. These sync pulse and "stop" signals are recorded on a separate control track on the tape to be later used during playback for keeping the recorder and a projector in synchronization. During the picture taking sequence, a sync signal switch in the camera opens and closes in response to a cam on the shutter shaft to provide a pulse for each frame advanced during a sound sequence. The sync signal from the camera is transmitted to the recorder to perform three functions. First, the sync signal is fed through a pulse integrating circuit which sends a delayed "start" signal to a motor power control switch that turns on the tape recorder transport motor. Secondly, the sync signal is sent through a shaper to a transducer head that records it on the control track of the tape. Thirdly, the sync signal is sent to a pulse detecting circuit that places a "start" mark on the film. When a camera is turned off, the pulse detector circuit senses the loss of sync signals and allows a "stop" signal to be recorded on the control track of the tape. The disadvantage of this system is that it requires the purchase of a specially adapted and relatively expensive tape recorder. The tape recorder must have at least two sound tracks, one for synchronization purposes and one to record the scene program. The tape recorder is necessarily complicated in that it must contain circuitry necessary to provide synchronization between the picture and sound records during both record and reproduction operations. For many people who now own personal tape recorders not so equipped, the purchase of a second recorder which duplicates many functions of the apparatus which they presently own would prove to be an expensive method of obtaining sound photography capabilities.

Commonly assigned, copending U.S. Pat. application Ser. No. 31,182, entitled Apparatus for the Synchronization of Separate Picture and Sound Records, filed in the name of M. Csontos describes an accessory device for use with a tape recorder of the type commonly found in use and with a camera having a sync pulse generator and a lamp for placing coding marks on the film. Circuitry in the accessory device includes a filter for rejecting a narrow band from the audio spectrum of the program being picked up by a microphone. An oscillator is provided to produce a carrier signal having a frequency variable within the band rejected from the program audio. Coding logic, responsive to the first pulse received from a camera during each scene, changes the frequency of the carrier signal so that adjacent audio scenes can be identified. The signals emitted by the oscillator bear a direct relationship to the rate at which the sync pulses are received from the cameras so as to code the audio tape with camera speed information. Further, the amplitude of the oscillator output is modulated to provide "clap-stick" effects at the start and end of a sound scene to assist in synchronization during sound transfer or playback. The output of the oscillator is mixed with the output of the narrow band reject filter to be recorded on a single track of a tape recorder. During sound transfer or playback, the signals can be separated for audio and synchronization purposes. The film in the camera is also coded at the start and end of a scene by coding logic in the accessory box which, upon receipt of the first and last synchronization pulse from the camera, actuate a lamp in the camera to fog the edge of the film at the appropriate location.

The Csontos application provides a solution to the problems mentioned above with respectect to the prior art systems, such as by providing proper synchronization between picture and sound records with positive means for identifying individual scenes and for distinguishing and identifying adjacent scenes on the recording.

SUMMARY OF THE INVENTION

The present invention is an improvement over that disclosed in the Csontos application.

A coding information signal having at least one variable characteristic is modified by a binary input signal to produce a binary output unique to the particular scene being filmed and the camera frame rate. The binary output is recordable on the tape and controls an encoding device in the camera to apply a similar scene identification code to the film.

In the specific embodiment shown, a camera is provided with a binary encoding device for energizing selective signal transmitters. The transmitters energized are changed from scene to scene. As a scene is being photographed, the transmitters are sequentially sampled and a representative electrical signal produced to control a tape encoding device to record a scene identification code and to control a mechanism for applying a similar scene identification code to the film in the camera.

The invention and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, which is a schematic illustration of the preferred embodiment of the present invention.

DESCRIPTION OF THE PREFERRED EMBODIMENT

The drawing shows a recording system for sound movies in accordance with an illustrated embodiment of the invention. A camera shown schematically and identified generally by the reference numeral 12 is of the amateur movie type well known in the art; elements not specifically shown or described taking various forms well known to those skilled in the art. Various modifications have been effected to the end that synchronization signals may be applied to film in camera 12 and to a sound tape in a tape recorder. The tape recorder has not been shown but may be, and is here assumed to be, a conventional magnetic tape recorder of the type commonly found in domestic use, which has a lower level microphone input suitable for a dynamic (moving coil) microphone, a requirement that is met by almost all solid state portable recorders now available.

Camera 12 may be provided with a battery 14 and a motor 16 for advancing film when a switch 18 is closed by a manual push button 20. A lamp 22 is positioned in the camera adjacent the film gate, preferably at a location where illumination of the lamp will light fog one edge of the film, for example the edge provided with sprocket holes.

All coding functions initiate at camera 12 which is equipped with a mechanism for generating electrical sync pulses or signals when motor 16 is running. Such mechanisms are generally well known in the art, and examples are shown in U.S. Pats. No. 2,679,187 and No. 3,266,862. In the following description, it is assumed that sync pulses are produced one per pulldown stroke upon closure of switch 24 by the pulldown claw mechanism, but other arrangements will readily occur to those skilled in the art.

Camera 12 is also provided with an encoding device which, in the preferred embodiment takes the form of a binary encoding disc upon which is provided an electrically conductive pattern 32 and a series of peripheral ratchet teeth 34. Encoding disc 30 is advanced in a clockwise direction one notch, or 1/32 revolution in the embodiment shown, each time push button 20 is depressed to initiate photographing a scene. As the conductive pattern 32 on disc 30 turns under a series of brushes 36, selected brushes contact the pattern to provide up to thirty-two different binary code outputs to five conductors or signal transmitters 38–42. The number of binary code outputs could obviously be increased or decreased as desired by providing a different conductive pattern and various other numbers of brushes. While I have shown encoding disc 30 being advanced one notch per scene by the depression of push button 20, it is to be understood that the encoding mechanism could take various other forms and could be indexed by other camera mechanisms, such as by either a footage or frame counter (not shown).

An accessory device 46 contains various control items which have been shown schematically in the drawing. It will be understood that while the accessory device has been shown as a separate item in the illustrated embodiment, its components may be incorporated in either the camera or the recorder housing if desired. Further, disc 30 may be physically housed in accessory device 46 rather than in camera 12. If such were the case, ratchet 34 could be indexed by a solenoid-operated mechanism rather than directly by push button 20.

Accessory device 46 houses a binary counter 48 which counts pulses transmitted by the closure of switch 24 in camera 12 until sixteen pulses have been received and then resets to zero. Counter 48 has outputs A, B, C, D, and E at which output pulses are generated by the counter as it receives the first, second, fourth, eighth and sixteenth sync pulses, respectively, from switch 24.

Binary counter 48 and a flip-flop 50 are connected to motor 16 in camera 12 by a conductor 52 having conductor branches 54 and 56. As shown a capacitor and a diode are connected in each of the circuits between motor 16, counter 48 and motor 16 and flip-flop 50 so that the turn on transient current of motor 16 resets binary counter 48 to zero and sets flip-flop 50 to produce an output in a conductor 58 interconnecting the flip-flop with an input of an AND-gate 60. The D output of binary counter 48 is used to reset flip-flop 50.

A series of conductors or signal transmitters 61–65 are arranged to be connected to conductors 38–42, respectively, by suitable cabling. Conductors 61–65 are inputs to a series of AND-gates 66–70, respectively. As shown, the other input to AND-gate 66 is output A of binary counter 48. In like manner, the other input to AND-gate 67 is counter output B, to AND-gate 68 are counter outputs A and B, to AND-gate 69 is counter output C and to AND-gate 70 are counter outputs A and C. Receipt by an AND-gate of a signal from counter 48 along a lead marked with a bar will inhibit operation of that AND gate. The outputs of AND-gates 66–70 are connected to OR-gate 72, as are output E of binary counter 48 and the reset transient of motor 16. The output of OR-gate 72 is connected to a modulator or source of coding information 74 and to AND-gate 60.

Accessory device 46 houses a conventional band-elimination filter 76. Filter 76 extracts a small frequency band of the audio spectrum of the signal picked up by a microphone, not shown, and transmitted along a conductor 78. The frequencies of the extracted band may then be utilized to receive coding signals as explained hereinafter without interference from the program audio coming from the scene to be photographed.

The output signal of wave filter 76 is transmitted via a conductor 80 to a mixer 82 to be combined with a scene identification signal emitted by an oscillator 86. At least one characteristic of the output of oscillator 86 is determined by modifier 74 and a monostable vibrator 88.

The various elements of accessory device 46 are powered by a battery pack 90 through a switch 92. The battery pack is shown in the illustrated embodiment as being physically housed in the accessory device, but it will be understood that the power could be derived from a source in the camera as described in the above-mentioned Csontos application.

Operation

In preparation for taking a sound movie, camera 12, a microphone (not shown) and a tape recorder (not shown) are connected to accessory box 46 by suitable cabling. Next, the recorder is placed in the record mode and the record level is adjusted as for normal tape recording. Now camera 12 may be started by depressing push button 20 to close switch 18 and thereby actuate camera drive motor 16. Depression of push button 20 also causes binary encoding disc 30 to be revolved 1/32 of a revolution so that portions of electrically conductive pattern 32 contact selected ones of brushes 36. As motor 16 drives the camera, switch 24 is momentarily closed once per pulldown movement.

The turn on transient of motor 16 is transmitted via conductors 52, 54 and 56 to reset binary counter 48 and flip-flop 50. Clock pulses from switch 24 proceed to step binary counter 48 through its range of one to sixteen pulses. Depending upon the position of binary encoding disc 30 in camera 12, various ones of AND-gates 66–70 will be supplied with input signals via conductors 61–65, respectively. As binary counter 48 proceeds through its first five counts, the five ANG-gates will be sequentially sampled by signals produced in counter outputs A, B and C. That is, when the first sync pulse is received by counter 48, a signal is transmitted by output A to AND-gate 66. Since there are no outputs B, C, or D, if the corresponding brush is contacting the conductive pattern of binary encoding disc 32, AND-gate 66 will produce an output signal to OR-gate 72. In like manner, as the second sync pulse signal is received by counter 48 from camera 12, counter output B will provide an input to AND-gate 67. Assuming that the corresponding brush does not contact the conductive pattern, no output will be produced by AND-gate 67 and no input will be received by OR-gate 72 (if the corresponding brush did contact the conductive pattern, AND-gate 67 would produce an output signal to OR-gate 72 since there are no outputs A, C or D). As the first five sync pulses of a set of sixteen are received by counter 48, all of the AND-gates 66–70 will be sampled in sequence. When there is coincident inputs to an AND-gate (and if inputs from the counter outputs marked in the drawing with a bar are not received), a pulse is passed through OR-gate 72 to actuate modulator 74 causing the modulator to change the output characteristic of oscillator 86 which is mixed with the audio and recorded on the tape. The encoding device will be continually sampled during the first five sync pulses of every subsequent group of sixteen pulses produced by switch 24 of camera 12, and a scene code group which is distinctive for each setting of encoding disc 30 will be recorded. Of course the disc setting changes with each scene.

During the very first sampling of AND-gates 66–70, the output of OR-gate 72 is passed through AND-gate 60 to energize lamp 22 of camera 12 each time there is coincident inputs to one of the five AND-gates. At the same time that the lamp is being flashed, modulator 74 is actuated to alter the output signal of oscillator 86 to place a distinctive code on he tape in the recorder. When the eighth sync pulse is transmitted to binary counter 48, counter output D resets flip-flop 50 to prevent further coincident inputs to AND-gate 60 until the camera is restarted and the flip-flop is reset by the turn-on transient of motor 16. To avoid a partial encoding of the film, a solenoid or similar device could be provided in camera 12 to prevent the release of push button 20 before the eighth pulse is received.

In order to provide a camera speed indication on the tape record, every sixteenth pulse received by binary counter 48 will produce a signal in counter output E to provide a fixed reference point on the tape. The first such fixed reference point is produced at the time the camera is first turned on by the turn-on transient of motor 16 transmitted by a conductor 94. In cases where extremely accurate synchronization between tape and film is necessary, speed synchronization could be obtained by the application of clock pulses to mixer 82. These clock pulses could be derived from the absence of switch 24 or from camera vibration pickup.

When a scene is completed and the camera power is turned off by releasing push button 20, the turn-off transient of motor 16 triggers monostable multivibrator 88 to cause modulator 74 to affect oscillator 86, thereby producing a distinctive "end-of-recording" burst on the tape.

Although the type of modulation of oscillator 86 has not been specifically set forth, it will be recognized that any one of a number of modulation techniques could be used to record the two level, sequential code groups. For instance, oscillator 86 could be either amplitude modulated or frequency modulated within the narrow elimination band provided by wave filter 76.

The invention has been described in detail with particular reference to a preferred embodiment thereof, but it will be understood that variations and modifications can be effected within the spirit and scope of the invention.

I claim:

1. A device, usable with a motion picture camera and a recorder for producing a record of the accompanying sound for pictures taken by the camera, said device comprising:
- a source of coding information having at least one variable output characteristic;
- means actuatable for modifying said output characteristic;
- means operable during the taking of a scene for sequentially actuating and deactuating said output characteristic modifying means in a predetermined sequence to binary encode the coding information;
- means for applying the coding information to the recorder; and
- means for changing said sequence of operation of said actuating means from one scene to the next, whereby the binary codes for adjacent scenes are distinct.

2. A device, usable with a motion picture camera of the type having means for applying code marks to the film and with a recorder for producing a record of the accompanying sound for pictures taken by the camera, said device comprising:
- means operable during the taking of a scene for sequentially actuating and deactuating the camera code mark applying means in a predetermined sequence to apply a binary code to the film in the camera; and
- means for changing said predetermined sequence of operation of said actuating means from one scene to the next, whereby the binary code applied to the film during adjacent scenes are distinct.

3. A device, usable with a motion picture camera of the type having means for applying code marks to the film and a recorder for producing a record of the accompanying sound for pictures taken by the camera, said device comprising:

a source of coding information having at least one variable output characteristic;

means actuatable for modifying said output characteristic;

means operable during the taking of a scene for sequentially actuating and deactuating said output characteristic modifying means and the camera code mark applying means in the same predetermined sequence to binary encode said coding information;

means for applying said coding information to the recorder and the camera; and means for changing said predetermined sequence of operation of said actuating means from one scene to the next, whereby the binary codes produced during adjacent scenes are distinct.

4. A device, usable with a sound recorder and motion picture filming apparatus, for producing a signal recordable by the recorder during the filming of a motion picture scene to permit synchronization between the sound and optical records, said device comprising:

a source of coding information having at least one variable output characteristic;

a plurality of signal sources;

an encoding device including means for selectively energiziig predetermined ones of said signal sources;

means for modifying the output of said coding information source in response to said modifying means being connected to an energized signal source;

means operable during the filming of each scene for sequentially connecting and disconnecting said signal sources to said modifying means; and means for changing from the filming of one scene to the next the predetermined ones of said signal sources energized, whereby a binary signal indicative of the particular scene being film is produced by said coding information source to permit scene synchronization between the sound and optical records.

5. A device as defined in claim 4 wherein said means for sequentially connecting and disconnecting said signal sources to said modifying means comprises:

a plurality of AND-gates, each of said plurality of signal sources being connected as an input to one of said AND-gates, respectively;

a binary counter having a series of output sets, each of said sets being connected as another input to one of said AND-gates, respectively, said AND-gates being adapted to produce an output signal when there is coincident inputs from the signal source and counter output set connected thereto;

means for transmitting the output signals produced by said AND-gates to said modifying means, whereby the output of said coding information source is modified each time there is such coincident inputs to one of said AND-gates.

6. A device as defined in claim 5 further comprising means for modifying the output of said coding information source at intervals determined by the running speed of the picture filming apparatus, whereby the sound and optical records may be speed synchronized.

7. A device, usable with a sound recorder and a motion picture filming apparatus of the type having means for applying code marks to motion picture film, said device comprising:

a plurality of signal sources;

an encoding device including means for selectively energizing predetermined ones of said signal sources;

means operable during the filming of a scene for sequentially sampling said signal sources to produce a binary signal indicative of the particular scene being filmed;

means actuatable by said binary signal to sequentially actuate and deactuate the camera code mark applying means in a sequence corresponding to the binary signal; and means for changing from the filming of one scene to the next the predetermined ones of said signal sources energized.

8. A device as defined in claim 7 wherein said means for sampling said signal sources comprises:

a plurality of AND-gates, each of said plurality of signal sources being connected as an input to one of said AND-gates, respectively;

a binary counter having a series of output sets, each of said sets being connected as another input to one of said AND-gates, respectively, said AND-gates being adapted to produce an output signal when there is coincident inputs from the signal source and counter output set connected thereto.

9. A device, usable with a motion picture filming apparatus of the type having means for applying code marks to the film and with a sound recorder of the type having means for producing a signal recordable by the recorder during the filming of a motion picture scene to permit synchronization between the sound and optical records said device comprising:

a source of coding information having at least one variable output characteristic;

a plurality of signal sources;

an encoding device including means for selectively energizing predetermined ones of said signal sources;

means operable during the filming of a scene for producing a binary signal indicative of the predetermined ones of said signal sources energized by sequentially sampling said signal sources;

means actuatable by said binary signal to modify the output of said coding information source, and for sequentially actuating and deactuating the camera code mark applying means in a sequence corresponding to the binary signal; and means for changing from the filming of one scene to the next the predetermined ones of said signal sources energized, whereby the binary code produced on the sound and optical records during one scene is distinct from the binary code produced during scenes adjacent to said one scene.

10. A device as defined in claim 9 wherein said means for producing a binary signal comprises:

a plurality of AND-gates, each of said plurality of signal sources being connected as an input to one of said AND-gates, respectively;

a binary counter having a series of output sets, each of said sets being connected as another input to one of said AND-gates, respectively, said AND-gates being adapted to produce an output signal when there is coincident inputs from the signal source and counter output set connected thereto.

11. A device as defined in claim 10 further comprising means for modifying the output of said coding information source at intervals determined by the running speed of the picture filming apparatus, whereby the sound and optical records may be speed synchronized.

References Cited

UNITED STATES PATENTS

| | | | |
|---|---|---|---|
| 2,044,333 | 6/1936 | Schmidt | 352—24 |
| 3,539,248 | 11/1970 | Lancor | 352—24 X |
| 2,822,722 | 2/1958 | Kennedy | 352—17 |

LOUIS R. PRINCE, Primary Examiner
F. SHOON, Assistant Examiner

U.S. Cl. X.R.

352—17, 92, 236